(12) United States Patent
Oya

(10) Patent No.: US 11,956,390 B2
(45) Date of Patent: Apr. 9, 2024

(54) IMAGE FORMING APPARATUS HAVING READING UNIT, INFORMATION PROCESSING APPARATUS, CONTROL METHODS, AND STORAGE MEDIA STORING CONTROL PROGRAMS FOR DETERMINING WHETHER A SETTING VALUE TO COMPLY WITH PDF/A STANDARD

(71) Applicant: CANON KABUSHIKI KAISHA, Tokyo (JP)

(72) Inventor: Hiroshi Oya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/296,075

(22) Filed: Apr. 5, 2023

(65) Prior Publication Data

US 2023/0344947 A1 Oct. 26, 2023

(30) Foreign Application Priority Data

Apr. 21, 2022 (JP) ................................. 2022-070302

(51) Int. Cl.
*H04N 1/00* (2006.01)
(52) U.S. Cl.
CPC ....... *H04N 1/0048* (2013.01); *H04N 1/00482* (2013.01); *H04N 1/00925* (2013.01); *H04N 1/0097* (2013.01)

(58) Field of Classification Search
CPC ............ H04N 1/0048; H04N 1/00482; H04N 1/00925; H04N 1/0097
USPC ........................................................ 358/1.15
See application file for complete search history.

(56) References Cited

U.S. PATENT DOCUMENTS

| 2009/0244596 A1* | 10/2009 | Katano | ................ | G06F 3/1238 |
| | | | | 358/1.15 |
| 2014/0258500 A1* | 9/2014 | Selvaraj | ................ | G06Q 10/10 |
| | | | | 709/224 |

FOREIGN PATENT DOCUMENTS

JP 2015226278 A 12/2015

* cited by examiner

*Primary Examiner* — Allen H Nguyen
(74) *Attorney, Agent, or Firm* — ROSSI, KIMMS & McDOWELL LLP

(57) ABSTRACT

An image forming apparatus capable of generating image data according to a setting compliant with PDF/A. A reading unit reads an image of a document and generates image data. A registration unit registers at least one setting value used by the reading unit in generating the image data. A setting unit sets whether to enable or disable a function that prevents a user from setting a setting value that does not comply with a PDF/A standard as a setting value used by the reading unit in generating the image data. And a change unit changes a setting value that does not comply with the PDF/A standard among the at least one setting value registered so as to comply with the PDF/A standard in enabling the function in a state where the registration unit registers the at least one setting value.

14 Claims, 14 Drawing Sheets

*FIG. 8*

| PDF/A Standard | Available Format |
|---|---|
| OFF | PDF, PAF, OCR, Digital Signature(Invisible), Digital Signature(Visible), Encryption |
| PDF/A-1b | PDF, PAF, Digital Signature(Invisible) |
| PDF/A-2 | PDF, PAF, OCR, Digital Signature(Invisible) |

| Inconsistency between the pre-registered setting value and the set PDF/A standard |
|---|
| Setting in registering the button does not comply with the set PDF/A standard. If you continue the process, data that does not comply with PDF/A standard will be generated. One of the following procedures is recommended. — 1101 |
| Continue the process after changing the pre-registered setting value of the button so as to comply with the set PDF/A standard. — 1102 |
| Newly create a button associated with a pre-registered setting value compliant with set PDF/A standard. — 1103 |
| Finish the process. — 1104 |

IMAGE FORMING APPARATUS HAVING READING UNIT, INFORMATION PROCESSING APPARATUS, CONTROL METHODS, AND STORAGE MEDIA STORING CONTROL PROGRAMS FOR DETERMINING WHETHER A SETTING VALUE TO COMPLY WITH PDF/A STANDARD

BACKGROUND OF THE INVENTION

Field of the Invention

The present invention relates to an image forming apparatus, a control method therefor, a storage medium storing a control program therefor, an information processing apparatus, a control method therefor, and a storage medium storing a control program therefor.

Description of the Related Art

There is a known image forming apparatus that reads an image of a document and generates image data in a data format designated by a user. PDF (Portable Document Format) is widely used as a data format of image data. PDF data can be encrypted by a password to restrict access, and a digital signature can be added thereto.

In the meantime, there is an international standard of ISO (hereafter referred to as "PDF/A") established in order to store PDF data for a long time. The PDF/A prohibits encryption, LZW compression, and an addition of a digital signature, etc., for example. A related technique is disclosed in Japanese Laid-Open Patent Publication No. 2015-226278 (JP 2015-226278A). In this technique, when the data format is set to the PDF/A, an image processing setting is automatically changed so that a subtractive color process will not be executed. In this way, in order to comply with the PDF/A, exclusive control to prohibited processes, such as an encryption process, is required. In order to facilitate setting to enable such exclusive control, development of an image forming apparatus including a means that allows a user to select ON/OFF of a PDF/A-compliant setting for generating image data according to the PDF/A-compliant setting has been considered. Thereby, when the PDF/A-compliant setting is set to ON, it is possible to manage image data in accordance with intention of an administrator to ensure storage of image data generated according to the setting compliant with the PDF/A.

However, even if the PDF/A-compliant setting is set to ON, image data may be generated according to a setting that does not comply with the PDF/A. Here, some image forming apparatuses have a function of calling a setting registered in advance, and can generate image data by reading an image of a document according to the called setting. For example, in a case where the settings registered in advance include a setting that does not comply with the PDF/A, such as an encryption setting, even if the PDF/A-compliant setting is set to ON, image data is generated according to the called setting that does not comply with the PDF/A.

SUMMARY OF THE INVENTION

The present invention provides a mechanism capable of generating image data according to the setting compliant with the PDF/A.

Accordingly, an aspect of the present invention provides an image forming apparatus including a reading unit configured to read an image of a document and to generate image data, a registration unit configured to register at least one setting value used by the reading unit in generating the image data, a unit configured to set whether to enable or disable a function that prevents a user from setting a setting value that does not comply with a PDF/A standard as a setting value used by the reading unit in generating the image data, and a unit configured to change a setting value that does not comply with the PDF/A standard among the at least one setting value registered so as to comply with the PDF/A standard in enabling the function in a state where the registration unit registers the at least one setting value.

According to the present invention, it is possible to generate image data according to the setting compliant with the PDF/A.

Further features of the present invention will become apparent from the following description of exemplary embodiments with reference to the attached drawings.

BRIEF DESCRIPTION OF THE DRAWINGS

FIG. 8 is a view showing an example of a PDF/A standard table used by the image forming apparatus in FIG. 1.

FIG. 11 is a view showing an example of an error screen displayed on the operation unit in FIG. 2.

DESCRIPTION OF THE EMBODIMENTS

Figure 1:
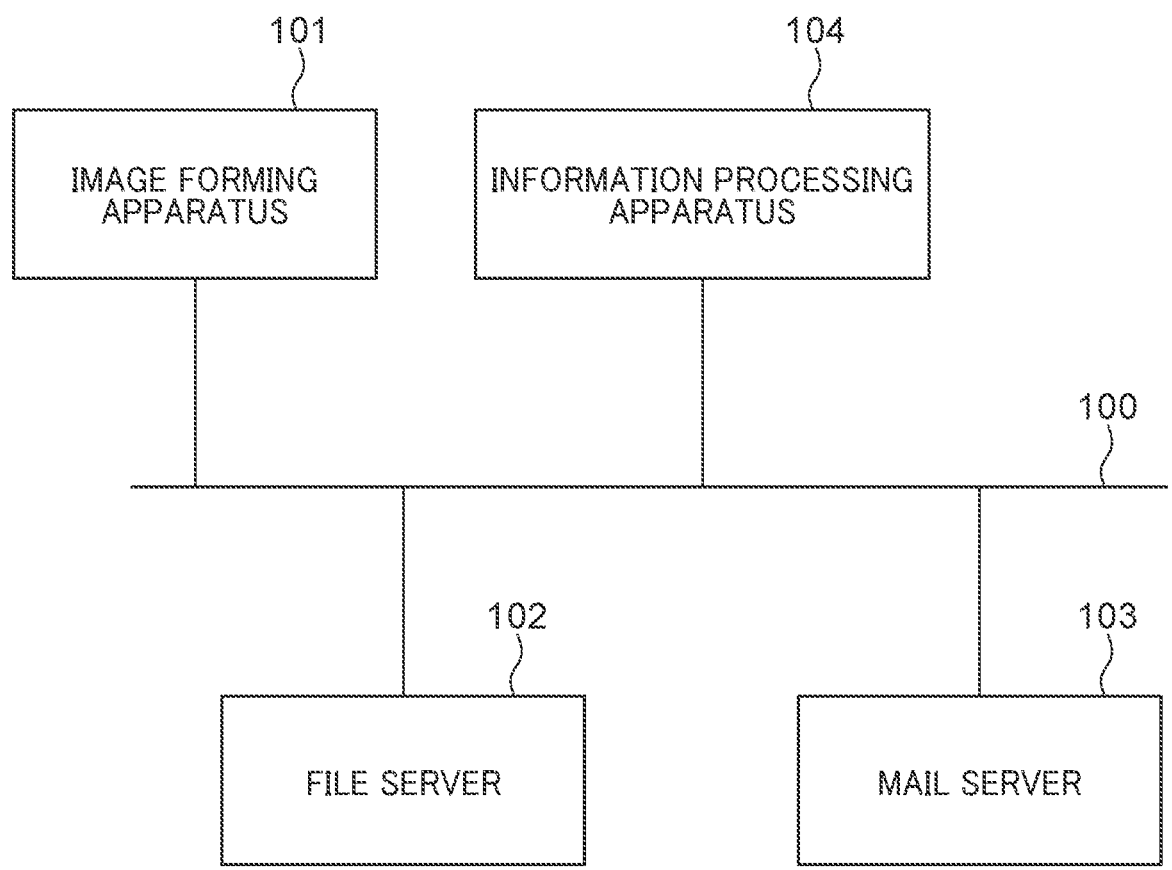
FIG. 1 is a block diagram showing an example of a network configuration including an image forming apparatus according to an embodiment of the present invention.

Hereafter, embodiments according to the present invention will be described in detail by referring to the drawings. It should be noted that the following embodiments do not limit the invention according to the claims, and all combinations of features described in the embodiments are not necessarily essential to solving means of the invention.

FIG. 1 is a block diagram showing an example of a network configuration including an image forming apparatus 101 according to an embodiment of the present invention. The image forming apparatus 101 is communicably connected to a file server 102, a mail server 103, and an information processing apparatus 104 via a network 100. In this embodiment, the network 100 is enough to have a function capable of transmitting image data, and may a wireless network through an access point (not shown), for example.

The image forming apparatus 101 reads an image of a document and generates image data. The image data in this embodiment is electronic data. The image data is, for example, electronic data obtained by converting an image into RAW data. The image data is not limited to electronic data obtained by converting an image into RAW data, and may be electronic data according to image formats, such as TIFF and JPEG, or electronic data according to the PDF.

The image forming apparatus 101 transmits the generated image data to the file server 102, the mail server 103, etc. The file server 102 supports the FTP or SMB protocol. The mail server 103 supports the SMTP protocol. The information processing apparatus 104 can refer to or update setting values of the image forming apparatus 101 according to the HTTP protocol.

Figure 2:
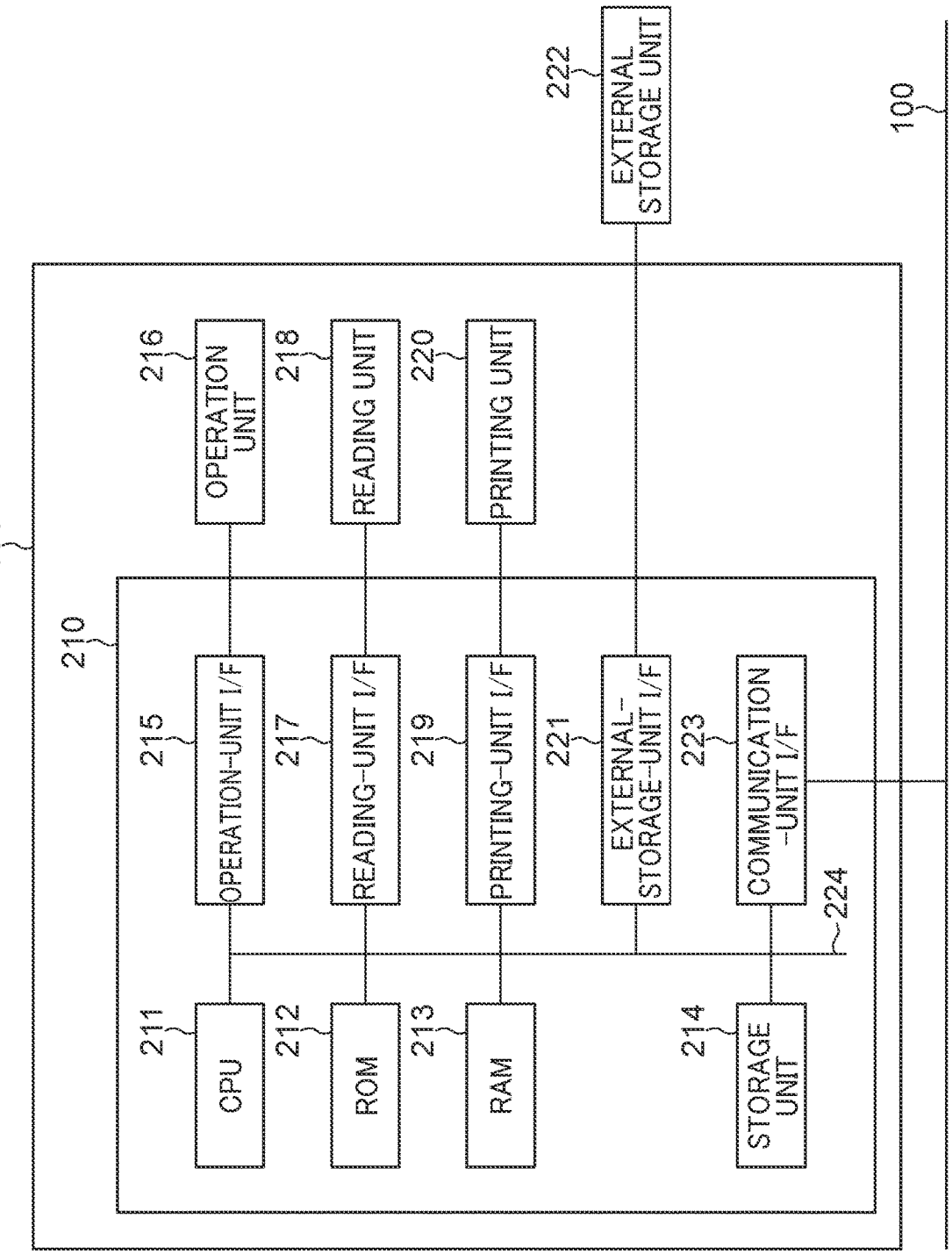
FIG. 2 is a block diagram schematically showing a configuration of the image forming apparatus in FIG. 1.

FIG. 2 is a block diagram schematically showing a configuration of the image forming apparatus 101 in FIG. 1. In this embodiment, the image forming apparatus 101 is assumed to be a multifunction peripheral (MFP) having a plurality of functions, such as a scan function, a copy function, and a communication function. However, the image forming apparatus 101 is not limited to the MFP. For example, the image forming apparatus 101 may be a reading apparatus, such as a scanner, having a scanning function and a communication function.

As shown in FIG. 2, the image forming apparatus 101 includes a control unit 210, an operation unit 216, a reading unit 218, and a printing unit 220. The control unit 210 controls the overall operation of the image forming apparatus 101. The control unit 210 is connected to the operation unit 216, the reading unit 218, and the printing unit 220. Further, the control unit 210 includes a CPU 211, a ROM 212, a RAM 213, a storage unit 214, an operation-unit I/F 215, a reading-unit I/F 217, a printing-unit I/F 219, an external-storage-unit I/F 221, and a communication-unit I/F 223. These components are mutually connected via a system bus 224.

The CPU 211 reads a control program stored in the ROM 212 or the storage unit 214 to control various processes, such as a reading process and a printing process. The ROM 212 stores the control program executable by the CPU 211. The ROM 212 stores a boot program, font, etc. The RAM 213 is a main memory of the CPU 211. The RAM 213 is used as a work area and as a temporary storage area for loading various control programs stored in the ROM 212 and the storage unit 214.

The storage unit 214 stores image data, print data, an address book, various programs, and various setting information. Although a flash memory shall be used as the storage unit 214 in this embodiment, an auxiliary storage device, such as an SSD, an HDD, or an eMMC, may be used as the storage unit 214.

Although the image forming apparatus 101 is configured such that the single CPU 211 executes processes shown in flowcharts mentioned later while using the single memory (RAM 213) in this embodiment, it is not limited to this. For example, a plurality of CPUs, RAMs, ROMs, and storage units may mutually cooperate to execute the processes shown in the flowcharts mentioned later. A part of the processes may be executed by using a hardware circuit, such as an ASIC or an FPGA.

The operation-unit I/F 215 is an interface for connecting the operation unit 216 and the control unit 210. The operation unit 216 displays information to a user and detects an operation input by the user. The reading-unit I/F 217 is an interface for connecting the reading unit 218 and the control unit 210.

The reading unit 218 reads an image on a document and converts the image into image data, such as binary data. The CPU 211 performs an encryption process and an image process to the image generated by the reading unit 218 in accordance with settings at the time of execution of reading. In this way, the image data generated through various processes is transmitted to the file server 102 etc., is stored in the external storage device 222, or is printed on a recording sheet by the printing unit 220.

The printing-unit I/F 219 is an interface for connecting the printing unit 220 and the control unit 210. The CPU 211 transmits image data to be printed (image data of a print target) to the printing unit 220 via the printing-unit I/F 219. The printing unit 220 prints an image on a recording sheet conveyed from a sheet feeding cassette (not shown).

The external-storage-unit I/F 221 is an interface for connecting an external storage device 222 and the control unit 210. The CPU 211 stores image data etc. in the external storage device 222 via the external-storage-unit I/F 221. In this embodiment, a USB interface is assumed as the external-storage-unit I/F 221 and a USB memory is assumed as the external storage device 222, but an external storage device like an SD card may be used as the external storage device 222.

The control unit 210 is connected to the network 100 via the communication-unit I/F 223. The communication-unit I/F 223 transmits image data to the file server 102, transmits an image-data-attached e-mail to the mail server 103, and transmits various kinds of setting information inside the image forming apparatus 101 to the information processing apparatus 104. The image data is transmitted using a protocol, such as FTP, SMB, or SMTP. Further, the communication-unit I/F 223 receives a reference request and a change request for various setting information in the image forming apparatus 101 from the information processing apparatus 104. The CPU 211 reads or changes various types of setting information stored in the storage unit 214 in accordance with these instructions. It should be noted that the process of transmitting various setting information to the information processing apparatus 104 and the process of receiving a reference request or a change request for the various setting information from the information processing apparatus 104 are performed by a web server application that processes HTTP.

Figure 3:
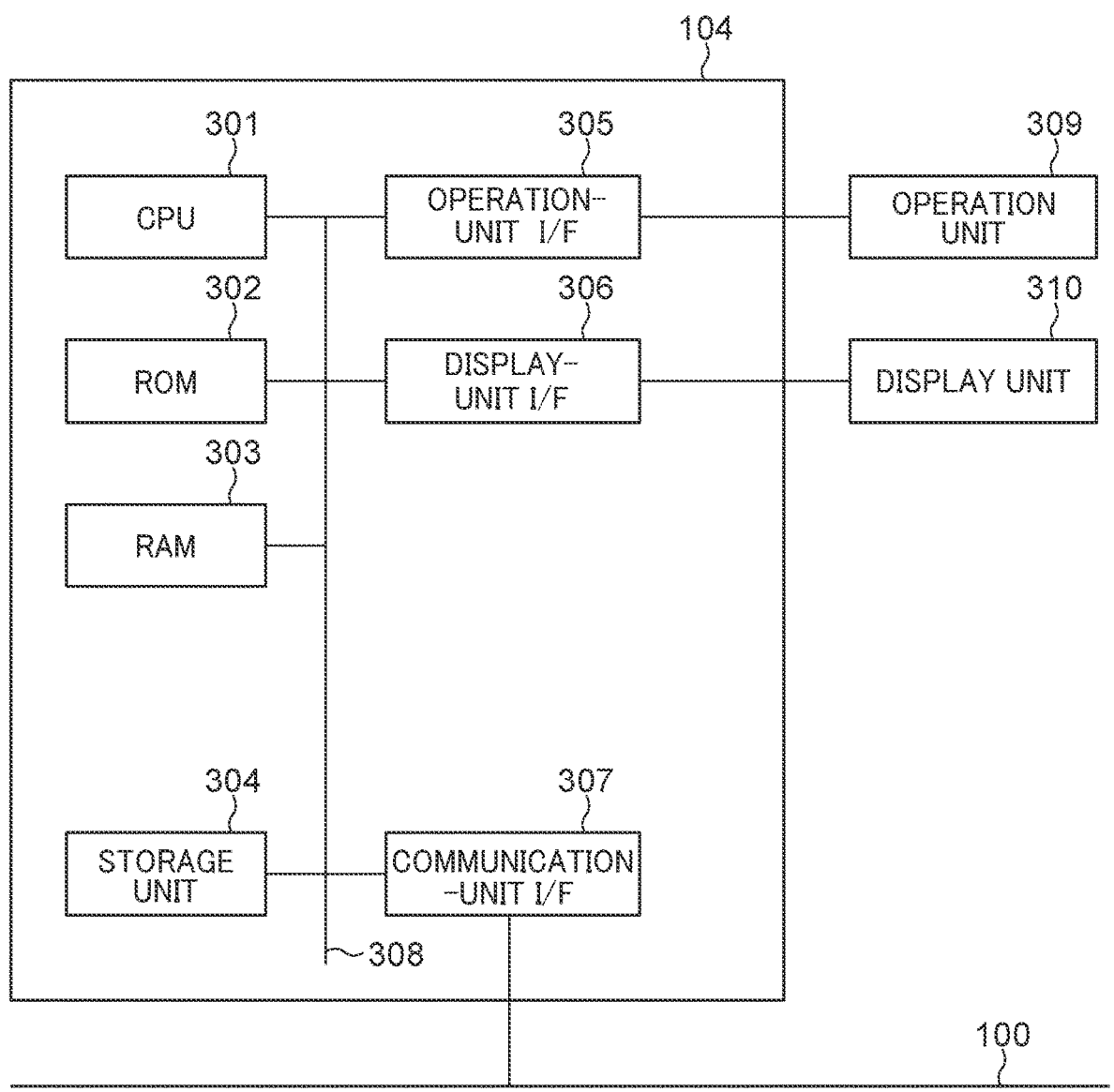
FIG. 3 is a block diagram schematically showing a configuration of an information processing apparatus in FIG. 1.

FIG. 3 is a block diagram schematically showing a configuration of the information processing apparatus 104 in FIG. 1. Although a personal computer (PC) shall be the information processing apparatus 104 in this embodiment, the information processing apparatus 104 is not limited to a PC. For example, the information processing apparatus 104 may be an apparatus having a communication function and a display unit, such as a smartphone or a tablet terminal.

As shown in FIG. 3, the information processing apparatus 104 includes a CPU 301, a ROM 302, a RAM 303, a storage unit 304, an operation-unit I/F 305, a display-unit I/F 306, and a communication-unit I/F 307. These components are mutually connected via a system bus 308.

The CPU 301 realizes functions of the information processing apparatus 104 by controlling the components of the information processing apparatus 104. The CPU 301 controls operations of the information processing apparatus 104 in accordance with a control program stored in the ROM 302. More specifically, the CPU 301 executes an OS etc. that control the information processing apparatus 104. Application programs on the OS mutually operate to operate and control various functions. The OS and various programs are stored in the ROM 302, are loaded to the RAM, and are executed by the CPU 301.

The ROM 302 is a memory for storing programs and various types of date used by the CPU 301. The RAM 303 is a work memory for temporarily storing programs and information used by the CPU 301 for calculations. The storage unit 304 stores various data, various programs, etc. Although a hard disk shall be used as the storage unit 304 in this embodiment, another nonvolatile storage device such as an SSD may be used as the storage unit 304.

The communication-unit I/F 307 is, for example, a network I/F for wired LAN communication, such as the Ethernet. The communication-unit I/F 307 may be a network I/F for wireless LAN communication, a USB-LAN I/F, or the like. The operation-unit I/F 305 is an interface for connecting a keyboard and a mouse of the operation unit 309 to the information processing apparatus 104.

The display-unit I/F 306 is an interface for connecting the display unit 310 like a liquid crystal monitor to the information processing apparatus 104. Although a configuration in which the operation unit 309 and the display unit 310 are connected to the information processing apparatus 104 will be described in this embodiment, the present invention is not limited to this configuration. For example, the information processing apparatus 104 may include the operation unit 309 and the display unit 310.

Figure 4:
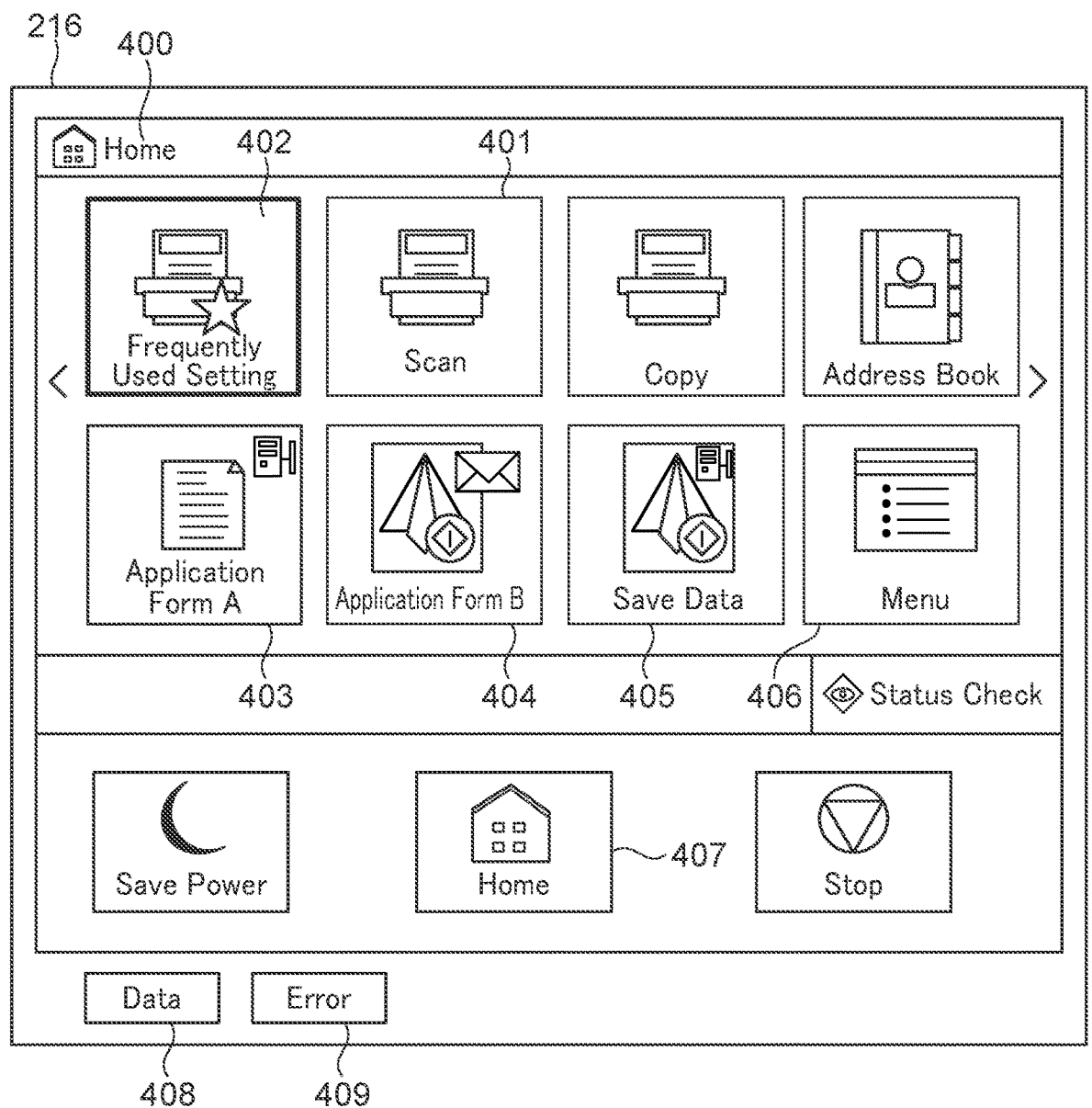
FIG. 4 is a view showing a configuration example of an operation unit in FIG. 2.

FIG. 4 is a view showing a configuration example of the operation unit 216 in FIG. 2. The operation unit 216 includes a touch panel 400, a data LED 408, and an error LED 409.

A home screen is displayed on touch panel 400, for example, immediately after the image forming apparatus 101 is activated. The home screen is used to instruct execution of each function of the image forming apparatus 101. A plurality of operation buttons are displayed on the home screen.

A scan button 401 is an operation button for causing the reading unit 218 to read a document and to generate image data of the document. An address book button is an operation button for displaying an address book management screen (not shown). Destination information is set on the address book management screen. The destination information includes a transmission type (e-mail transmission, SMB transmission, FTP transmission, or WebDAV transmission), a name, an e-mail address, a host name, server information, etc.

A frequently used setting button 402 is a button for calling a pre-registered setting value. When the frequently used setting button 402 is pressed by a user, for example, the reading unit 218 reads a document using a setting value associated with the pressed button and generates image data of the document. An application form A button 403, an application form B button 404, and a data save button 405 are one-touch transmission scan buttons. When these buttons are pressed by the user, the reading unit 218 reads a document using a setting value associated with the pressed button and generates image data of the document. The generated image data is transmitted to a destination indicated by the setting value.

A menu button 406 is an operation button for executing various settings of the image forming apparatus 101, for printing a report, etc. When the menu button 406 is pressed by the user, a list of various settings and executable operations is displayed. The list also includes an item for displaying a PDF/A-compliant setting screen 700 shown in FIG. 7 mentioned later. A home button 407 is an operation button for displaying the home screen. The home button 407 is always displayed on the operation unit 216.

A data LED 408 and an error LED 409 notify the user of a status of the image forming device 101. For example, the data LED 408 is turned on during execution of an e-mail job or a file transmission job. The error LED 409 is turned on when an error occurs in the image forming apparatus 101.

Figure 5:
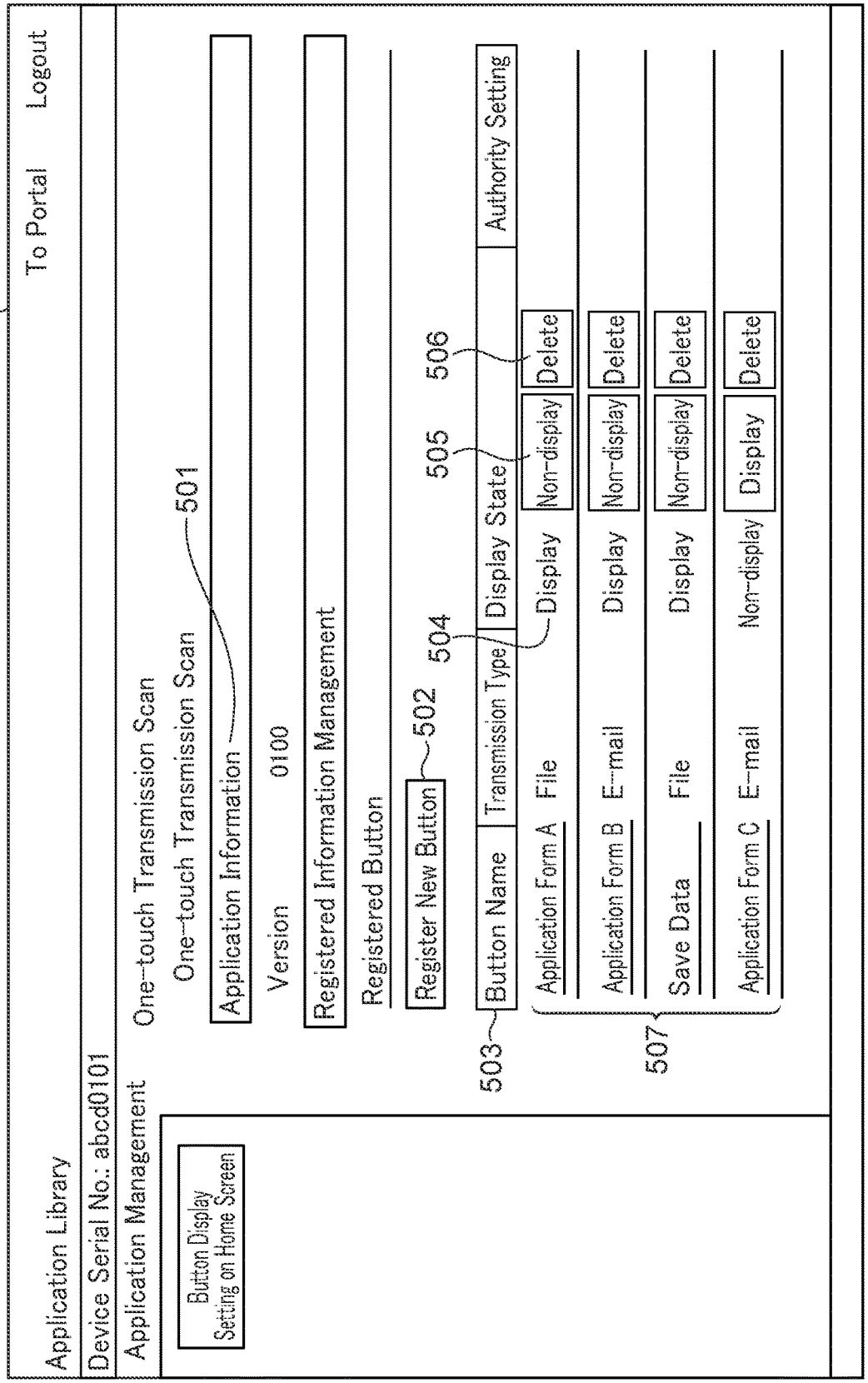
FIG. 5 is a view showing an example of an application management screen for registering a one-touch transmission scan button displayed on a home screen of FIG. 4.

FIG. 5 is a view showing an example of an application management screen 500 for registering a one-touch transmission scan button displayed on the home screen of FIG. 4. The application management screen 500 is displayed on the display unit 310 of the information processing apparatus 104 when the information processing apparatus 104 establishes an HTTP connection to the image forming apparatus 101 via a browser.

In this embodiment, although a configuration in which the application management screen 500 and a setting editing screen 600 in FIG. 6 described below are displayed on the display unit 310 of the information processing apparatus 104 will be described, the configuration is not limited thereto. For example, when the operation unit 216 has a browser display function, the application management screen 500 and the setting editing screen 600 described below may be displayed on the operation unit 216.

On the application management screen 500, "One-touch Transmission Scan" is displayed as a name of an application. A one-touch transmission scan application is an application for calling a setting value registered in advance, reading a document to generate image data of the document on the basis of the called setting value, and transmitting the generated image data to a transmission destination. In this embodiment, a plurality of one-touch transmission scan buttons having different setting values can be registered. Hereinafter, a setting value registered in association with a one-touch transmission scan button is referred to as a pre-registered setting value.

A version of the one-touch transmission scan application is displayed as application information 501. In FIG. 5, the version number "0100" is displayed. A new-button registration button 502 is a button for creating a new one-touch transmission scan button. When the user presses the new-button registration button 502, the setting editing screen 600 shown in FIG. 6 described later is displayed on the display unit 310.

In a button title area 503, titles (a button name, a transmission type, a display state, and an authority setting) of columns of a button information area 507 are displayed. In the button information area 507, information about the registered one-touch transmission scan buttons is displayed. In a button name column, the names of the registered one-touch transmission scan buttons are displayed. The user can select a displayed button name.

When the user selects one button name from among the displayed button names, the setting editing screen 600 described below is displayed on the display unit 310. In a transmission type column, transmission types set to the one-touch transmission scan buttons are displayed. A transmission type is set on the setting editing screen 600 described later. A display state column includes a button display setting 504, a display/non-display switching button 505, and a delete button 506.

In the button display setting 504, information indicating whether the one-touch transmission scan button is displayed on the touch panel 400 is displayed. For example, the one-touch transmission scan button in which "Display" is displayed in the button display setting 504 is displayed on the touch panel 400. In the meantime, the one-touch transmission scan button in which "Non-display" is displayed in the button display setting 504 is not displayed on the touch panel 400. The display/non-display switching button 505 can be toggled between "Display" and "Non-display". When the user presses the display/non-display switching button 505, "Display" and "Non-display" of the button display setting 504 is switched. The delete button 506 is a button for deleting information related to the registered one-touch transmission scan button.

FIG. 5 shows the information regarding the four one-touch transmission scan buttons of which the button names are "Application Form A", "Application Form B", "Save Data", and "Application Form C". Since the button display setting 504 is "Display" for each of the one-touch transmission scan buttons of which the button names are "Application Form A", "Application Form B", and "Save Data", these one-touch transmission scan buttons are displayed on the touch panel 400. In the meantime, since the button display setting 504 of the one-touch transmission scan button of which the button name is "Application Form C" is "Non-display", this one-touch transmission scan button is not displayed on the touch panel 400.

Figure 6:
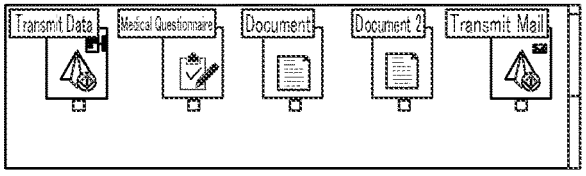
FIG. 6 is a view showing an example of a setting editing screen displayed on a display unit in FIG. 3.

FIG. 6 is a view showing an example of the setting editing screen 600 transited from the application management screen 500 of FIG. 5.

On the setting editing screen 600, transmission settings, such as a button name, a transmission destination, a transmission file name, and a transmission type (file, e-mail, USB memory) are set. Further, on the setting editing screen 600, a display content of the one-touch transmission scan button and an operation when the button is pressed are set. FIG. 6 shows the information related to the data save button 405 as an example. These pieces of information are saved in the storage unit 214 as the pre-registered setting values of the data save button 405.

The transmission settings include basic settings, such as a read size, a color mode, and a file format. The transmission settings also include detailed settings related to PDF data, such as an encrypted PDF menu 601, a "Set/Change Password" check box 602, a password input field 603, and a digital signature menu 604.

The encrypted PDF menu 601 is a pull-down menu for setting an encryption method of PDF data. When encryption is not needed, "No" is selected. In FIG. 6, "256-bit AES" is selected as an example. In the encrypted PDF menu 601, an encryption method other than "256-bit AES" may be selected.

The "Set/Change Password" check box 602 is used to select whether to set or change a password. When the "Set/Change Password" check box 602 is checked, the password input field 603 and a confirmation input field become capable of inputting. When the "Set/Change Password" check box 602 is not checked, the password input field 603 and the confirmation input field are displayed in a grayout state and become incapable of inputting. As an example, FIG. 6 shows a state in which the "Set/Change Password" check box 602 is checked and a password is set. In addition, since the "Set/Change Password" check box 602 and the password input field 603 are sub-settings of the encrypted PDF menu, when "none" is set in the encrypted PDF menu 601, the check box and the input fields are displayed in the grayout state, become incapable of inputting, and the setting becomes invalid.

The digital signature menu 604 is a pull-down menu for setting a digital signature. In the digital signature menu 604, for example, any one of "No", "Digital Signature (visible)", and "Digital Signature (invisible)" is set. In FIG. 6, as an example, "No" that does not include a digital signature is set.

Figure 7:
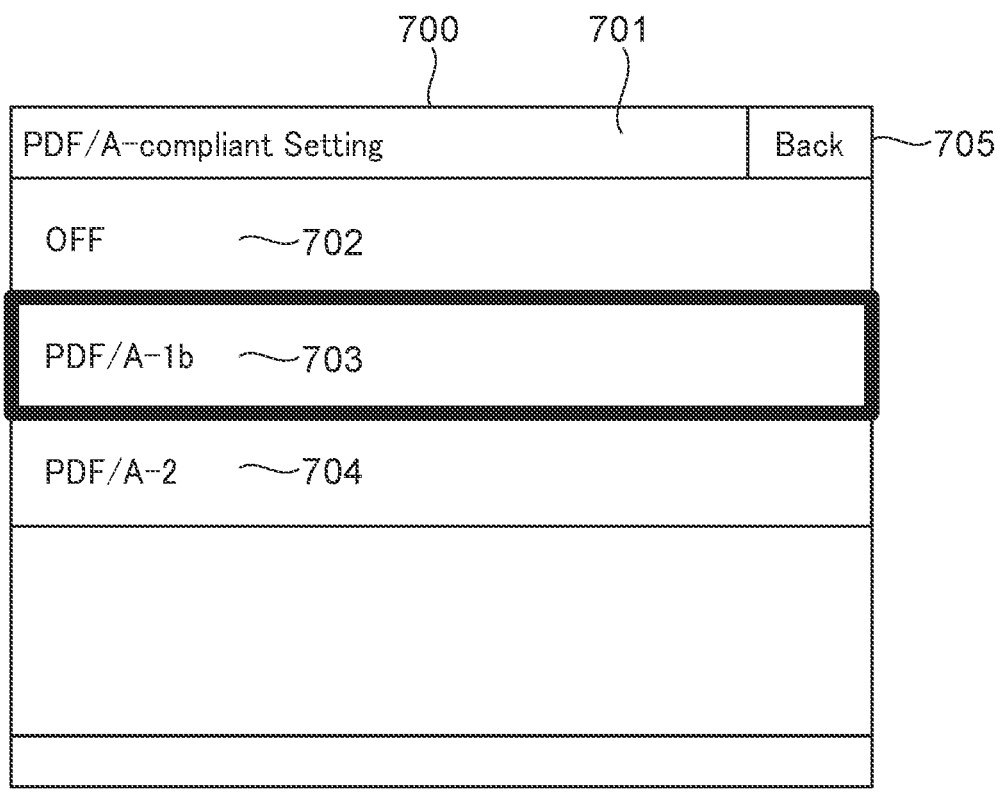
FIG. 7 is a view showing an example of a PDF/A-compliant setting screen displayed on the operation unit in FIG. 2.

FIG. 7 is a view showing an example of the PDF/A-compliant setting screen 700 displayed on the operation unit 216 in FIG. 2. The PDF/A-compliant setting screen 700 is displayed on the operation unit 216 when the user selects "PDF/A-compliant setting" from a menu list screen (not shown) displayed on the operation unit 216 by pressing the menu button 406 on the home screen.

The PDF/A-compliant setting screen 700 is used to set whether to enable or disabled a function of preventing a user from setting a setting value that does not comply with PDF/A (hereinafter referred to as a "PDF/A-compliant function") in generating PDF image data (hereinafter referred to as "PDF data"). The setting values set on the PDF/A-compliant setting screen 700 are stored in the storage unit 214 as PDF/A-compliant settings.

The PDF/A-compliant setting screen 700 includes a setting name display area 701, an OFF button 702, a PDF/A-1b button 703, a PDF/A-2 button 704, and a back button 705.

In the setting name display area 701, a setting name is displayed, and in FIG. 7, "PDF/A-compliant Setting" is displayed. The OFF button 702 is a button to disable the PDF/A-compliant function. When the user selects the OFF button 702, a setting value "0" corresponding to "OFF" is stored in the storage unit 214 as the PDF/A-compliant setting.

The PDF/A-1b button 703 is a button to enable the PDF/A-compliant function and to set the PDF/A standard to PDF/A-1b. PDF/A-1 is based on Adobe PDF 1.4, and determines an indispensable function, a use-restricted function, a use-prohibited function, etc. among various objects of PDF data defined in Adobe PDF 1.4. The PDF/A-1 includes PDF/A-1a and PDF/A-1b that have different compliance levels.

The PDF/A-1b is a standard that complies with a part of the International Standard ISO 19005-1. The PDF/A-1b requires to create PDF data so that a displayed appearance of the PDF data will be always the same independently of a device (apparatus) and displaying software, and requires embedding of metadata. The PDF/A-1a further requires to have a tag indicating a logical structure of a document in the PDF data, that is, to be a tagged PDF data. When the user selects the PDF/A-1b button 703, a setting value "1" corresponding to "PDF/A-1b" is stored in the storage unit 214 as the PDF/A-compliant setting.

The PDF/a-2 button 704 is a button to enable the PDF/A-compliant function and to set the PDF/A standard to PDF/A-2. The PDF/A-2 is based on the International Standard ISO 32000-1 (PDF 1.7). Enhancement from PDF 1.4 to PDF 1.7 is reflected to the PDF/A-2. Specifically, an image in JPEG 2000 format and another PDF/A file can be embedded, transparent graphics and a layer function can be used. When the user selects the PDF/A-2 button 704, a setting value "2" corresponding to "PDF/A-2" is stored in the storage unit 214 as the PDF/A-compliant setting. When the PDF/A-compliant setting is stored in the storage unit 214, the PDF/A-compliant setting screen 700 is closed and the display returns to the menu list screen.

In the image forming apparatus 101, as shown in a PDF/A standard table 800 in FIG. 8, an executable process in generating PDF data differs on the basis of the PDF/A-compliant setting. For example, when the PDF/A-compliant setting is "1" corresponding to the PDF/A-1b, execution of an OCR process is prohibited in generating PDF data. In the meantime, when the PDF/A-compliant setting is "2" corresponding to the PDF/A-2, the OCR process can be executed in generating the PDF data.

Referring back to FIG. 7, the back button 705 is a button for returning the display to the menu list screen. When the user selects the back button 705, the PDF/A-compliant setting screen 700 is closed and the display returns to the menu list screen. At this time, the PDF/A-compliant setting is not changed and an original value is maintained. In this embodiment, the three cases of "OFF", "PDF/A-1b", and "PDF/A-2" have been described as options of the PDF/A-compliant setting. However, other options, such as "PDF/A-1a" and "PDF/A-3" may be included. When a PDF/A standard is added in the future, the standard may be added as an option.

FIG. 8 is a view showing an example of the PDF/A standard table 800 used by the image forming apparatus 101 in FIG. 1. The PDF/A standard table 800 is held in the storage unit 214. The PDF/A standard table 800 includes a PDF/A standard column 801 and an executable format column 802.

In the PDF/A standard column 801, the types of PDF/A standards corresponding to the setting values of the PDF/A-compliant settings are indicated. In this embodiment, as described above, the setting value of the PDF/A-compliant setting of "OFF" is "0". The setting value of the PDF/A-compliant setting of "PDF/A-1b" is "1". The setting value of the PDF/A-compliant setting of "PDF/A-2" is "2".

The executable format column 802 includes operations that are executable in generating PDF data. For example, when the PDF/A standard 801 is "OFF", that is, when the PDF/A-compliant function is disabled, the encryption process is executable in generating the PDF data. In the meantime, when the PDF/A standard 801 is "PDF/A-1b" or "PDF/A-2", the encryption process is prohibited in generating the PDF data. In addition, for example, when the PDF/A standard 801 is "PDF/A-1b", the OCR process is prohibited in generating the PDF data. When the PDF/A standard 801 is "PDF/A-2", the OCR process is executable in generating the PDF data.

In this embodiment, when the PDF/A-compliant function is set to be valid, a setting value that does not comply with the PDF/A is not registered as a pre-registered setting value. In the meantime, when the PDF/A-compliant function is set to be invalid, a setting value that does not comply with PDF/A can be registered as a pre-registered setting value. Even if the PDF/A compliant function is enabled after a setting value that does not comply with the PDF/A standard is registered as a pre-registered setting value, PDF data that does not comply with the PDF/A standard may be generated using the pre-registered setting value.

In the meantime, in this embodiment, when the PDF/A-compliant function is set to be valid in a state where the pre-registered setting value is registered, a setting value that does not comply with the PDF/A among the pre-registered setting values is changed so as to comply with the PDF/A.

Figure 9:
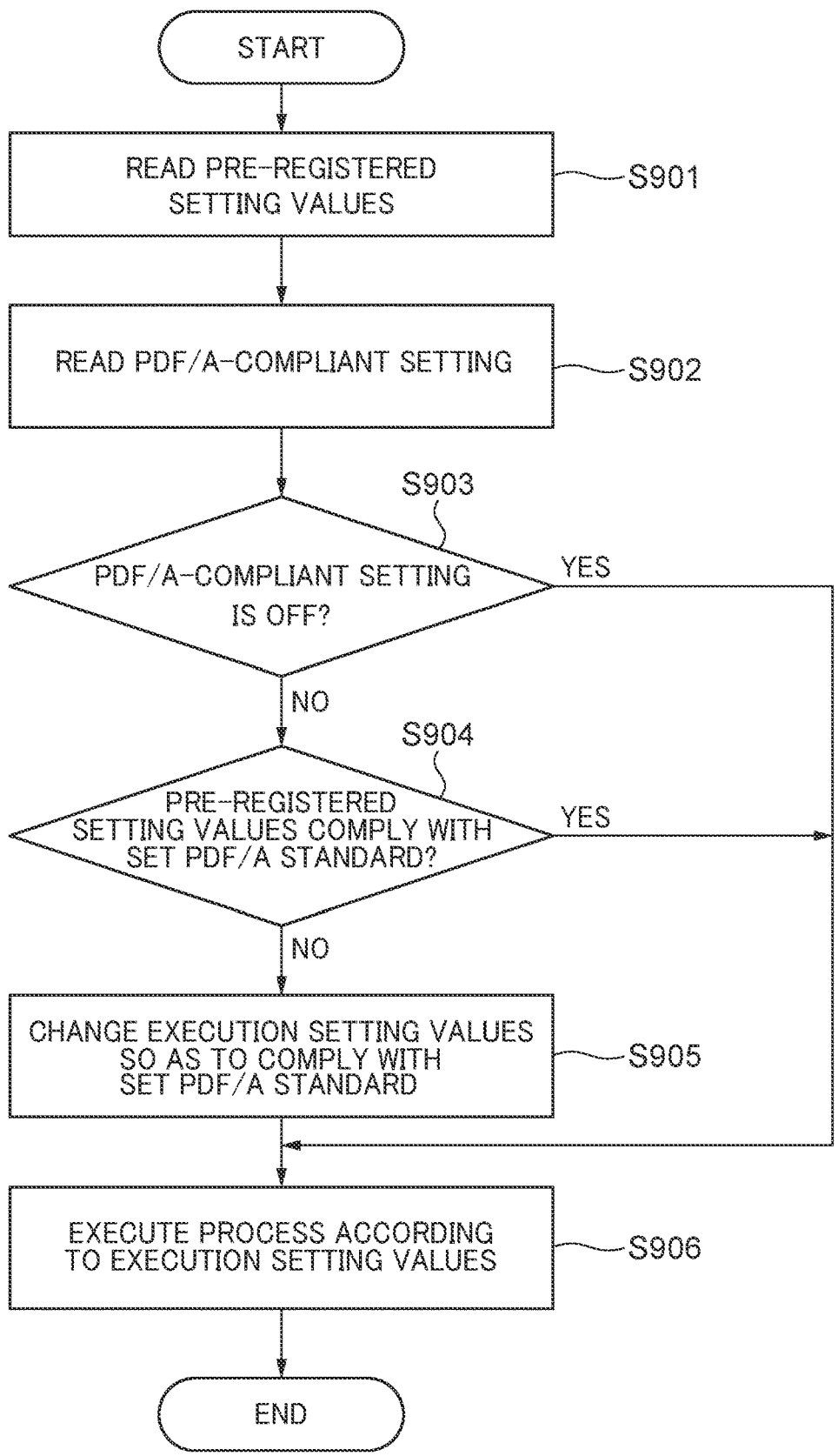
FIG. 9 is a flowchart showing a procedure of a one-touch transmission scan control process performed in the image forming apparatus in FIG. 1.

FIG. 9 is a flowchart showing a procedure of a one-touch transmission scan control process performed in the image forming apparatus 101 in FIG. 1. The one-touch transmission scan control process is achieved by the CPU 211 executing a program stored in the ROM 212. The one-touch transmission scan control process is executed when the one-touch transmission scan button on the home screen displayed on the operation unit 216 is pressed by the user.

In FIG. 9, when detecting that the one-touch transmission scan button is pressed by the user, the CPU 211 reads the pre-registered setting values of the pressed one-touch transmission scan button from the storage unit 214 (a step S901). Hereinafter, a case where the data save button 405 as an example of the one-touch transmission scan button is pressed by the user will be described. The CPU 211 copies the read pre-registered setting values as execution setting values and stores them in the RAM 213. Next, the CPU 211 reads the PDF/A-compliant setting from the storage unit 214 (a step S902). Next, the CPU 211 determines whether the PDF/A-compliant setting is "OFF" (a step S903). Specifically, the CPU 211 determines whether the setting value of the PDF/A-compliant setting is "0" corresponding to "OFF".

When it is determined in the step S903 that the PDF/A-compliant setting is "OFF", the process proceeds to a step S906 mentioned later. When it is determined in the step S903, when the PDF/A-compliant setting is not "OFF", the process proceeds to a step S904 mentioned later.

In the step S904, the CPU 211 determines whether the pre-registered setting values comply with the PDF/A standard set in the PDF/A-compliant setting. Hereinafter, the PDF/A standard set in the PDF/A-compliant setting is referred to as a "set PDF/A standard". In the step S904, the CPU 211 first obtains an executable format corresponding to the PDF/A-compliant setting read in the step S902 from the PDF/A standard table 800. For example, when the PDF/A-compliant setting read in step S902 is "1" corresponding to the "PDF/A-1b", the CPU 211 obtains the executable format of the "PDF/A-1b" from the PDF/A standard table 800.

In particular, the CPU 211 obtains "PDF", "PAF", and "digital signature (invisible)" that are executable formats of the "PDF/A-1b". Based on the obtained information, the CPU 211 determines whether the pre-registered setting values comply with the set PDF/A standard. In this embodiment, the settings related to compliance with the PDF/A are the setting value in the encrypted PDF menu 601 and the setting values in the digital signature menu 604 among the pre-registered setting values.

Hereinafter, for example, the above-mentioned pre-registered setting values shall be the setting values shown in FIG. 6. The obtained executable formats include the "digital signature (invisible)", and the digital signature menu 604 in FIG. 6 is set to "No". Such a setting value in the digital signature menu 604 complies with the set PDF/A standard. If the setting value in the digital signature menu 604 is the "digital signature (visible)", the obtained executable format does not comply with the set PDF/A standard because the obtained executable format is the "digital signature (invisible)".

In the meantime, the "encryption" is not included in the obtained executable formats, but the "256-bit AES" is set in the encrypted PDF menu 601 in FIG. 6. Such a setting value of the encryption PDF data does not comply with the set PDF/A standard. In this way, when there is at least one pre-registered setting value that does not comply with the set PDF/A standard, it is determined that the pre-registered setting values do not comply with the set PDF/A standard. In the meantime, when there is no setting value that does not comply with the set PDF/A standard among the pre-registered setting values, it is determined that the pre-registered setting values comply with the set PDF/A standard.

When it is determined in the step S904 that the pre-registered setting values comply with the set PDF/A standard, the process proceeds to a step S906 described below. When it is determined in the step S904 that the pre-registered setting values do not comply with the set PDF/A standard, the process proceeds to a step S905 described below.

In the step S905, the CPU 211 changes an execution setting value that does not comply with the set PDF/A standard among the execution setting values stored in the RAM 213 so as to comply with the set PDF/A standard. For example, as described above, when the setting value in the encrypted PDF menu 601 does not comply with the set PDF/A standard, the setting value in the encrypted PDF menu 601 among the execution setting values is changed to "No" that is the setting value compliant with the set PDF/A standard. In addition, the password, which is a sub setting of the encrypted PDF, is invalidated.

The setting value in the digital signature menu 604 is not changed because it complies with the set PDF/A standard. As described above, in this embodiment, the execution setting value obtained by copying the pre-registered setting value is changed, and the pre-registered setting value itself is kept as-is without being changed. Thereby, for example, when the PDF/A-compliant setting is reset to "OFF", the data save button 405 can be used with the original setting. As a result, it is possible to avoid a situation in which the pre-registered setting value associated with the data save button 405 is changed and the user is confused.

Next, the CPU 211 executes a process corresponding to the save button 405, which is the one-touch transmission scan button pressed by the user, according to the execution setting value (a step S906). Specifically, the CPU 211 performs a document reading process, an image process, and a PDF-data generation process according to the execution setting values, and further performs a process to transmit the PDF data to the transmission destination indicated by the execution setting value. After that, this process is finished.

In the meantime, in this embodiment, when the PDF/A-compliant function is set to be valid in a state where the pre-registered setting values are registered, a setting value that does not comply with the PDF/A among the pre-registered setting values is changed so as to comply with the PDF/A. Thereby, the PDF data can be generated with the setting compliant with the set PDF/A standard.

In the above-described embodiment, when the one-touch transmission scan button associated with the pre-registered setting value is pressed by the user, it is determined whether the pre-registered setting value complies with the set PDF/A standard before starting the process of generating PDF data. As a result, when the PDF/A compliant function is valid, the PDF data can be reliably generated with the setting compliant with the set PDF/A standard.

It should be noted that the pre-registered setting value may be directly changed in the step S905 instead of the execution setting value.

Moreover, the user may select whether to update the pre-registered setting value so as to comply with the set PDF/A standard or to newly create an object associated with the pre-registered setting value compliant with the set PDF/A standard.

Figure 10:
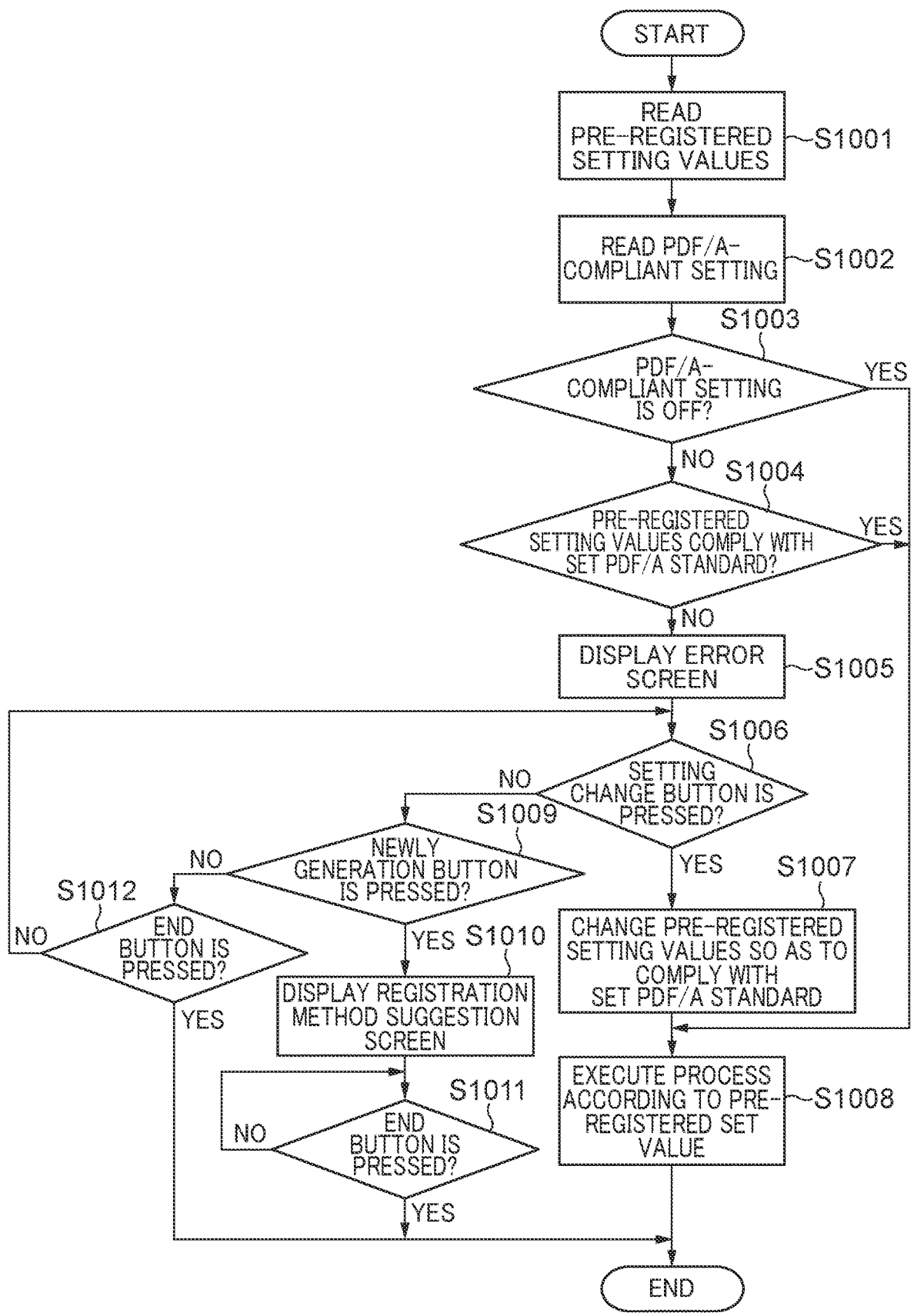
FIG. 10 is a flowchart showing another procedure of the one-touch transmission scan control process performed in the image forming apparatus in FIG. 1.

FIG. 10 is a flowchart showing another procedure of the one-touch transmission scan control process performed in the image forming apparatus 101 in FIG. 1. The one-touch transmission scan control process in FIG. 10 is similar to the above-described one-touch transmission scan control process in FIG. 9. In the following description, contents different from the above-described one-touch transmission scan control process in FIG. 9 will be particularly described.

The one-touch transmission scan control process in FIG. 10 is also realized by the CPU 211 executing a program stored in the ROM 212 as with the one-touch transmission scan control process in FIG. 9 described above. The one-touch transmission scan control process shown in FIG. 10 is executed when the one-touch transmission scan button on the home screen displayed on the operation unit 216 is pressed by the user as with the one-touch transmission scan control process shown in FIG. 9.

In FIG. 10, the CPU 211 first performs processes in steps S1001 to S1003 that are similar to the processes in the above-described steps S901 to S903. In the one-touch transmission scan control process in FIG. 10, unlike the one-touch transmission scan control process in FIG. 9, an execution setting value is not generated and a pre-registered setting value is directly changed if needed.

When it is determined in the step S1003 that the PDF/A-compliant setting is "OFF", the process proceeds to a step S1008 mentioned later. When it is determined in the step S1003 that the PDF/A-compliant setting is not "OFF", the process proceeds to a step S1004 that is similar to the process in the above-mentioned step S904. When it is determined in the step S1004 that the pre-registered setting values comply with the set PDF/A standard, the process proceeds to the step S1008 described below. When it is determined in the step S1004 that the pre-registered setting values do not comply with the set PDF/A standard, the process proceeds to a step S1005.

In the step S1005, the CPU 211 displays an error screen 1100 shown in FIG. 11 on the operation unit 216. The error screen 1100 includes a description display area 1101, a setting change button 1102, a new creation button 1103, and an end button 1104.

A notification indicating that the pre-registered setting value does not comply with the set PDF/A standard is displayed in the description display area 1101. The setting change button 1102 is a button to instruct to continue the process by updating the pre-registered setting value of the one-touch transmission scan button so as to comply with the set PDF/A standard. The pre-registered setting value compliant with the set PDF/A standard is obtained by changing a setting value that does not comply with the set PDF/A standard among the pre-registered setting values so as to comply with the set PDF/A standard.

The new creation button 1103 is a button to instruct to newly create a one-touch transmission scan button associated with a pre-registered setting value compliant with the set PDF/A standard. The end button 1104 is a button to instruct to immediately finish the process. Next, the CPU 211 determines whether the setting change button 1102 on the error screen 1100 is pressed by the user (a step S1006).

When it is determined in the step S1006 that the setting change button 1102 on the error screen 1100 is pressed by the user, the CPU 211 changes the pre-registered setting value that does not comply with the set PDF/A standard so as to comply with the set PDF/A standard (a step S1007).

Next, the CPU 211 executes a process corresponding to the one-touch transmission scan button pressed by the user according to the pre-registered setting value (the step S1008). This pre-registered setting value is the setting value read in the step S1001 or the setting value changed so as to comply with the set PDF/A standard in the step S1007. In the step S1008, the CPU 211 performs the document reading process, the image process, and the PDF-data generation process according to the pre-registered setting value, and further performs the process to transmit the PDF data to the transmission destination set to the pre-registered setting value. After that, this process is finished.

When it is determined in the step S1006 that the setting change button 1102 on the error screen 1100 is not selected by the user, the CPU 211 determines whether the new creation button 1103 on the error screen 1100 is pressed by the user (a step S1009).

Figure 12:
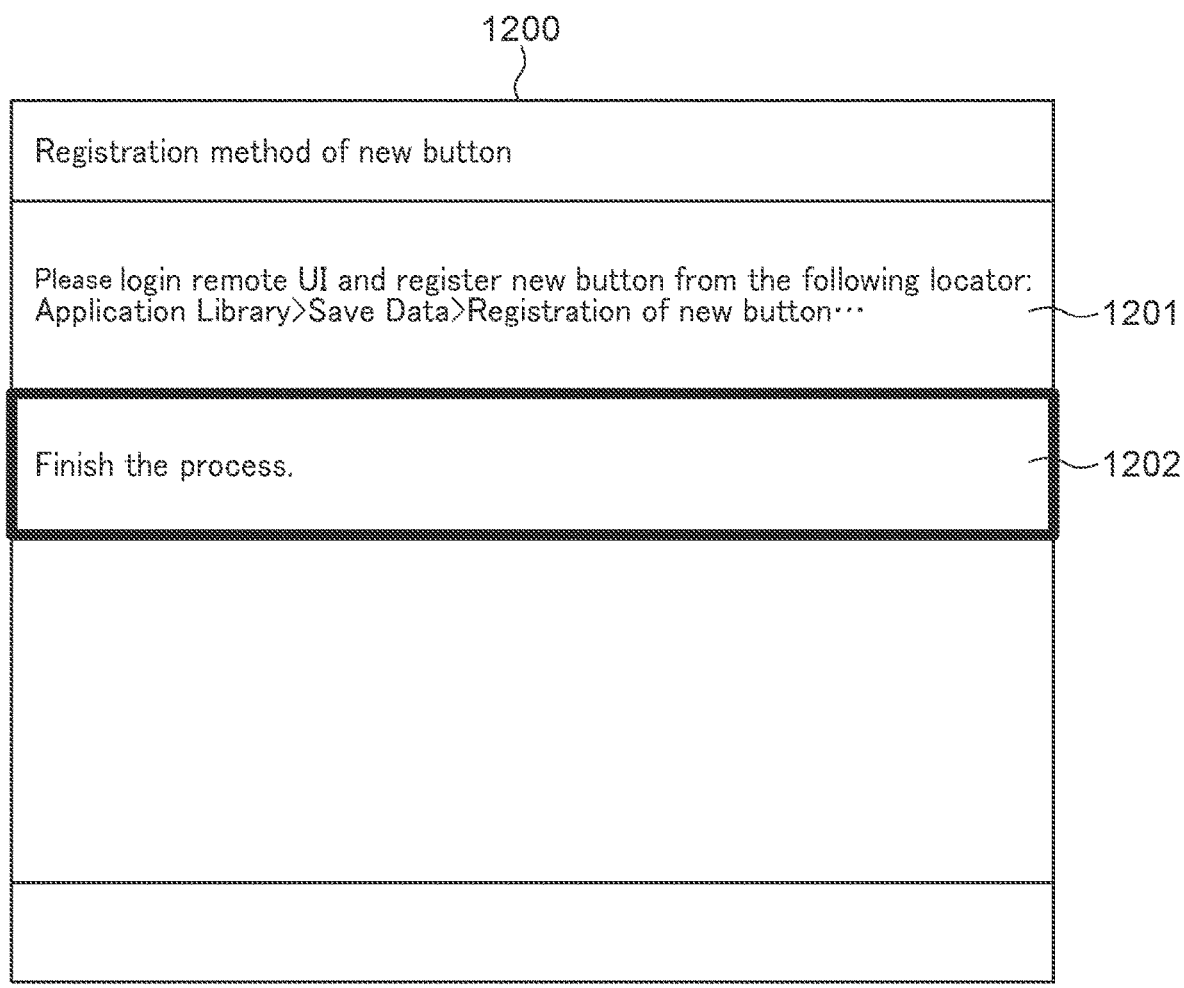
FIG. 12 is a view showing an example of a registration method suggestion screen displayed on the operation unit in FIG. 2.

When it is determined in the step S1009 that the new creation button 1103 on the error screen 1100 is pressed by the user, the CPU 211 causes the operation unit 216 to display a registration method suggestion screen 1200 shown in FIG. 12 (a step S1010). The registration method suggestion screen 1200 includes a description display area 1201 and an end button 1202. In the description display area 1201, a notification indicating a registration method of a new button is displayed.

In this embodiment, it is assumed that the application management screen 500 for registering a one-touch transmission scan button is displayed on the display unit 310 of the information processing apparatus 104 that is HTTP-connected to the image forming apparatus 101 via the browser. Therefore, the method of registering a one-touch transmission scan button from another apparatus like the information processing apparatus 104 is displayed as an example in the description display area 1201 in FIG. 12.

In the meantime, when the operation unit 216 has a browser display function, a screen equivalent to the application management screen 500 may be displayed on the operation unit 216 in the step S1010 instead of the registration method suggestion screen 1200. By displaying the screen related to the registration of the one-touch transmission scan button in this way, the user can newly register the one-touch transmission scan button more easily.

The CPU 211 then waits until the end button 1202 on the registration method suggestion screen 1200 is selected by the user. When the end button 1202 is selected by the user (YES in a step S1011), the CPU 211 finishes this process.

When it is determined in the step S1009 that the new creation button 1103 on the error screen 1100 is not selected by the user, the CPU 211 determines whether the end button 1104 on the error screen 1100 is pressed by the user (a step S1012). When it is determined in the step S1012 that the end button 1104 on the error screen 1100 is not selected by the user, the process returns to the step S1006. When it is determined in the step S1012 that the end button 1104 on the error screen 1100 is pressed by the user, the process is finished.

In the above-mentioned embodiment, when the pre-registered setting value does not comply with the set PDF/A standard, the error screen 1100 is displayed on the operation unit 216. The error screen 1100 is a screen that allows the user to select whether to update the pre-registered setting value so as to comply with the set PDF/A standard or to newly create an object associated with a pre-registered setting value compliant with the set PDF/A standard. Thus, the user's intention can be reflected to the management of the pre-registered setting value after changing the setting value so as to comply with the set PDF/A standard.

In addition, in the above-described embodiment, whether the pre-registered setting value complies with the set PDF/A standard may be determined when the PDF/A-compliant setting is changed.

Figure 13:
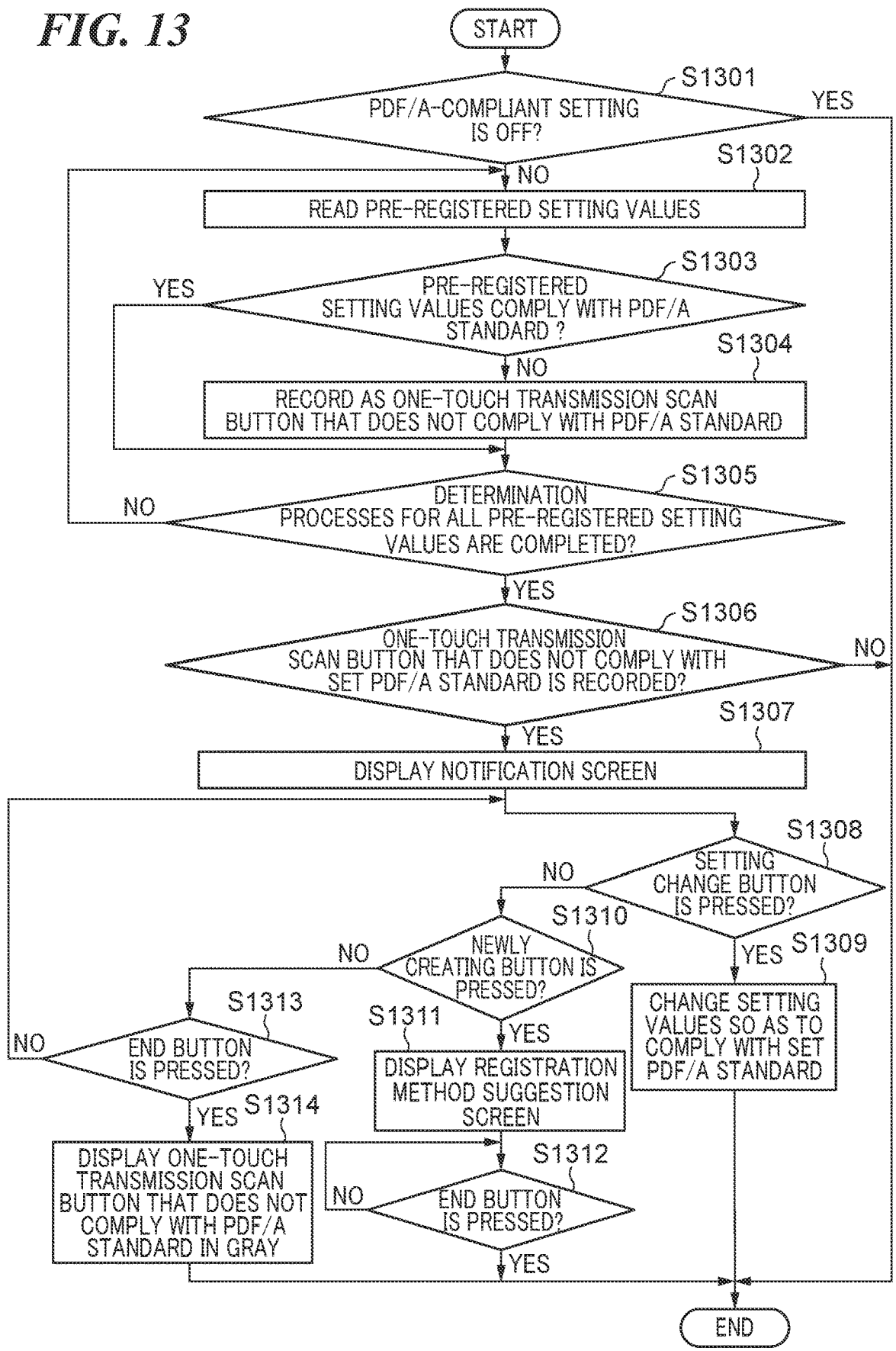
FIG. 13 is a flowchart showing a procedure of a PDF/A compliance determination process performed in the image forming apparatus of FIG. 1.

FIG. 13 is a flowchart showing a procedure of a PDF/A compliance determination process performed in the image forming apparatus 101 in FIG. 1. The PDF/A compliance determination process is realized by the CPU 211 executing a program stored in the ROM 212. The PDF/A compliance determination process is executed when the user changes the PDF/A compliance setting on the PDF/A compliance setting screen 700.

In FIG. 13, the CPU 211 reads the PDF/A-compliant setting from the storage unit 214 and determines whether the PDF/A-compliant setting is "OFF" (a step S1301). When it is determined in the step S1301 that the PDF/A-compliant setting is "OFF", the process is finished. When it is determined in the step S1301 that the PDF/A-compliant setting is not "OFF", the CPU 211 reads a pre-registered setting value of a one-touch transmission scan button from the storage unit 214 (a step S1302).

In this embodiment, there shall be the pre-registered setting values of four one-touch transmission scan buttons whose button names are "Application Form A", "Application Form B", "Data Save", and "Application Form C" in FIG. 5. In the step S1302, for example, a pre-registered setting value of a one-touch transmission scan button is read from among the pre-registered setting values of the one-touch transmission scan buttons stored in the storage unit 214.

In the description, the pre-registered setting value of the application form A button 403 shall be read. Although the configuration in which the pre-registered setting values of the one-touch transmission scan buttons stored in the storage unit 214 are read one by one is described in this embodiment, the configuration is not limited to this configuration. The pre-registered setting values of all the one-touch transmission scan buttons may be read simultaneously.

Next, the CPU 211 determines whether the read pre-registered setting value of the one-touch transmission scan button complies with the set PDF/A standard as with the step S904 described above (a step S1303). When it is determined in the step S1303 that the read pre-registered setting value of the one-touch transmission scan button complies with the set PDF/A standard, the process proceeds to a step S1305 described below. When it is determined in the step S1303 that the read pre-registered setting value does not comply with the set PDF/A standard, the process proceeds to a step S1304.

In the step S1304, the CPU 211 records the one-touch transmission scan button of this pre-registered setting value into the RAM 213 as the one-touch transmission scan button that does not comply with the set PDF/A standard. Next, the CPU 211 determines whether the determination processes for the pre-registered setting values of all the one-touch transmission scan buttons are completed (the step S1305).

When it is determined in the step S1305 that the determination process for the pre-registered setting value of any one of the one-touch transmission scan buttons is not completed, the process returns to the step S1302. The CPU 211 reads the pre-registered setting value of the next one-touch transmission scan button, which is the pre-registered setting value of the application form B button, for example, from the storage unit 214 and performs the process in the step S1303. In this embodiment, the determination processes are performed for all the pre-registered setting values of the one-touch transmission scan buttons stored in the storage unit 214 in this way.

When it is determined in the step S1305 that the determination processes for the pre-registered setting values of all the one-touch transmission scan buttons are completed, the CPU 211 determines whether a one-touch transmission scan button that does not comply with the set PDF/A standard is recorded in the RAM 213 (a step S1306). When it is determined in the step S1306 that a one-touch transmission scan button that does not comply with the set PDF/A standard is not recorded in the RAM 213, the process is finished.

Figure 14:
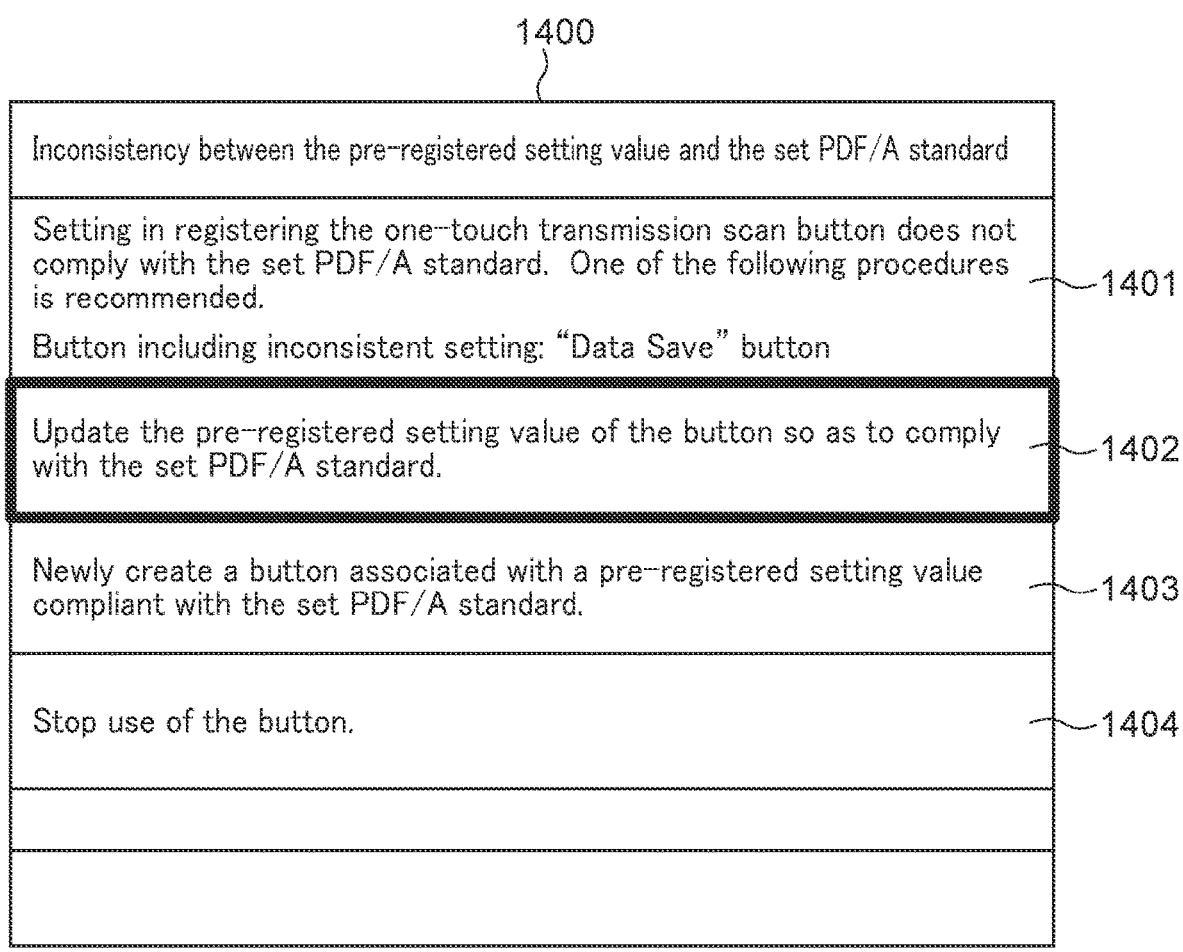
FIG. 14 is a view showing an example of a notification screen displayed on the operation unit in FIG. 2.

When it is determined in the step S1306 that a one-touch transmission scan button that does not comply to the set PDF/A standard is recorded in the RAM 213, the CPU 211 causes the operation unit 216 to display a notification screen 1400 shown in FIG. 14 (a step S1307).

The notification screen 1400 includes a description display area 1401, a setting change button 1402, a new creation button 1403, and an end button 1404. A name of a one-touch transmission scan button that does not comply with the set PDF/A standard is displayed in the description display area 1401. The setting change button 1402 is a button to instruct to update the pre-registered setting value of the one-touch transmission scan button so as to comply with the set PDF/A standard.

The new creation button 1403 is a button to instruct to newly create a one-touch transmission scan button associated with a pre-registered setting value compliant with the set PDF/A standard. The end button 1404 is a button to instruct to immediately finish the process.

Next, the CPU 211 determines whether the setting change button 1402 on the notification screen 1400 is pressed by the user (a step S1308). When it is determined in the step S1308 that the setting change button 1402 on the notification screen 1400 is pressed by the user, the process proceeds to a step S1309.

In the step S1309, the CPU 211 changes the setting value that does not comply with the set PDF/A standard among the pre-registered setting values so as to comply with the set PDF/A standard. In the step S1309, all the setting values that do not comply with the set PDF/A standard among the pre-registered setting values are changed so as to comply with the set PDF/A standard. After that, this process is finished.

When it is determined in the step S1308 that the setting change button 1402 on the notification screen 1400 is not pressed by the user, the process proceeds to a step S1310. In the step S1310, the CPU 211 determines whether the new creation button 1403 on the notification screen 1400 is pressed by the user.

When it is determined in the step S1310 that the new creation button 1403 on the notification screen 1400 is pressed by the user, the CPU 211 causes the operation unit 216 to display the registration method suggestion screen 1200 (a step S1311). When the user selects the new creation button 1403, it is regarded as an indication of intention to leave the existing one-touch transmission scan buttons as-is, and the one-touch transmission scan buttons are not disabled in this embodiment.

However, even if the user presses such a one-touch transmission scan button, the process corresponding to the one-touch transmission scan button concerned is not executed using the former pre-registered setting value in the one-touch transmission scan control process in FIG. 9 or FIG. 10 as a result. It should be noted that such a one-touch transmission scan button that is substantially unusable may be displayed in the grayout state and may be disabled.

Next, the CPU 211 waits until the end button 1202 on the registration method suggestion screen 1200 is pressed by the user. When the end button 1202 is pressed by the user (YES in a step S1312), the CPU 211 finishes this process.

When it is determined in the step S1310 that the new creation button 1403 on the notification screen 1400 is not pressed by the user, the CPU 211 determines whether the end button 1404 on the notification screen 1400 is pressed by the user (a step S1313). When it is determined in the step S1313 that the end button 1404 on the notification screen 1400 is not pressed by the user, the process returns to the step S1308. When it is determined in the step S1313 that the end button 1404 on the notification screen 1400 is pressed by the user, the process proceeds to a step S1314.

The CPU 211 controls to display the one-touch transmission scan button that does not comply with the set PDF/A standard in the grayout state and to disable it (the step S1314). This can prevent the user from pressing the one-touch transmission scan button that does not comply with the set PDF/A standard, which can avoid generation of the PDF data using the pre-registered setting value that does not comply with the set PDF/A standard. When there are a plurality of pre-registered setting values that do not comply with the set PDF/A standard, the CPU 211 controls to display all the one-touch transmission scan buttons in the grayout state and to disable them in the step S1314. After that, this process is finished.

In the above-described embodiment, it is determined whether the pre-registered setting value complies with the set PDF/A standard when the PDF/A-compliant setting is changed. As a result, even if the user presses the one-touch transmission scan button of the pre-registered setting value that does not comply with the set PDF/A standard because of a change in the PDF/A-compliant setting, PDF data can be generated with the setting compliant with the set PDF/A standard.

In the above-described embodiment, the object with which the pre-registered setting value is associated is not limited to the one-touch transmission scan button, and it may be the frequently used setting button 402.

In the above-described embodiment, the configuration in which the user presses the one-touch transmission scan button displayed on the operation unit 216 of the image forming apparatus 101 to instruct generation of PDF data has been described, but the configuration is not limited thereto. For example, a screen equivalent to the home screen may be displayed on the display unit 310 of the information processing apparatus 104 that has logged in the image forming apparatus 101 via a remote UI (user interface), and the user may select a one-touch transmission scan button on the screen to generate PDF data. In such a configuration, the above-described one-touch transmission scan control process and PDF/A compliance determination process are executed by the CPU 301 of the information processing apparatus 104 executing a program stored in the ROM 302.

The CPU 301 of the information processing apparatus 104 executes the above-described one-touch transmission scan control process in FIG. 9 or FIG. 10, when the user presses the one-touch transmission scan button or the frequently used setting button 402 on the screen equivalent to the home screen displayed on the display unit 310. For example, the CPU 301 of the information processing apparatus 104 obtains the pre-registered setting value of the one-touch transmission scan button registered in advance, the PDF/A-compliant setting, and the PDF/A standard table 800 from the image forming apparatus 101 when the user logs in the image forming apparatus 101 via the remote UI.

It should be noted that the timing of obtaining these data is not limited to this timing. The CPU 301 may be configured to periodically obtain these data from the image forming apparatus 101. The CPU 301 executes the one-touch transmission scan control process shown in FIG. 9 or FIG. 10.

In the one-touch transmission scan control process in FIG. 10, the error screen 1100 and the registration method suggestion screen 1200 are displayed on the display unit 310 of the information processing apparatus 104. The CPU 301 generates an instruction notification on the basis of the execution setting value obtained by the one-touch transmission scan control process in FIG. 9 or FIG. 10 or the pre-registered setting value complying to the set PDF/A standard. This instruction notification causes the image forming apparatus 101 to read an image of a document and to generate image data.

Next, the CPU 301 controls the communication-unit I/F 307 to transmit this instruction notification to the image forming apparatus 101. In this way, PDF data can be generated with the setting compliant with the set PDF/A standard in the configuration in which the user operates the information processing apparatus 104 to instruct generation of the PDF data.

Further, for example, the CPU 301 of the information processing apparatus 104 executes the PDF/A compliance determination process in FIG. 13, when the user changes the PDF/A-compliant setting on the screen equivalent to the PDF/A compliance setting screen 700 displayed on the display unit 310. For example, the CPU 301 of the information processing apparatus 104 obtains the pre-registered setting value of the one-touch transmission scan button registered in advance, the PDF/A-compliant setting, and the PDF/A standard table 800 from the image forming apparatus 101 when the user logs in the image forming apparatus 101 via the remote UI.

It should be noted that the timing of obtaining these data is not limited to this timing. The CPU 301 may be configured to periodically obtain these data from the image forming apparatus 101. The CPU 301 executes the PDF/A compliance determination process in FIG. 13 using the obtained data. In the PDF/A compliance determination process in FIG. 13, the notification screen 1400 is displayed on the display module 310 of the information processing apparatus 104. Moreover, the CPU 301 controls the communication-unit I/F 307 to transmit the pre-registered setting value compliant with the set PDF/A standard obtained by the above-described PDF/A compliance determination process in FIG. 13 to the image forming apparatus 101.

In this manner, PDF data can be generated with the setting compliant with the set PDF/A standard in the configuration in which the user operates the information processing apparatus 104 to change the PDF/A-compliant setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070302, filed Apr. 21, 2022, which is hereby incorporated by reference herein in its entirety.

What is claimed is:

1. An image forming apparatus comprising:
 a reading unit configured to read an image of a document and to generate image data;
 a registration unit configured to register at least one setting value used by the reading unit in generating the image data;
 a unit configured to set whether to enable or disable a function that prevents a user from setting a setting value that does not comply with a PDF/A standard as a setting value used by the reading unit in generating the image data; and
 a unit configured to change a setting value that does not comply with the PDF/A standard among the at least one setting value registered so as to comply with the PDF/A standard in enabling the function in a state where the registration unit registers the at least one setting value.

2. The image forming apparatus according to claim 1, wherein it is determined whether a setting value complies with the PDF/A standard before starting a process of generating the image data in a case where the user selects an object associated with the setting value.

3. The image forming apparatus according to claim 2, further comprising a unit configured to disable an object associated with a setting value that does not comply with the PDF/A standard.

4. The image forming apparatus according to claim 2, further comprising a unit configured to prompt the user, in a case where the setting value associated with the object does not comply with the PDF/A standard, to select whether to update the setting value associated with the object so as to comply with the PDF/A standard or to newly create an object associated with a setting value that complies with the PDF/A standard.

5. The image forming apparatus according to claim 2, wherein an execution setting value obtained by copying the setting value associated with the object is changed so as to comply with the PDF/A standard in a case where the setting value does not comply with the PDF/A standard.

6. An information processing apparatus causing an image forming apparatus to read an image of a document and to generate image data according to an instruction from a user, the information processing apparatus comprising:
 a registration unit configured to register at least one setting value used by the image forming apparatus in generating the image data;
 a unit configured to set whether to enable or disable a function that prevents a user from setting a setting value that does not comply with a PDF/A standard as a setting value used by the image forming apparatus in generating the image data;

a unit configured to change a setting value that does not comply with the PDF/A standard among the at least one setting value registered so as to comply with the PDF/A standard in enabling the function in a state where the registration unit registers the at least one setting value; and a unit configured to transmit an instruction notification that instructs the image forming apparatus to generate image data based on the setting value changed.

7. The information processing apparatus according to claim 6, wherein it is determined whether a setting value complies with the PDF/A standard before transmitting the instruction notification in a case where the user selects an object associated with the setting value.

8. The information processing apparatus according to claim 7, further comprising a unit configured to disable an object associated with a setting value that does not comply with the PDF/A standard.

9. The information processing apparatus according to claim 7, further comprising a unit configured to prompt the user, in a case where the setting value associated with the object does not comply with the PDF/A standard, to select whether to update the setting value associated with the object so as to comply with the PDF/A standard or to newly create an object associated with a setting value that complies with the PDF/A standard.

10. The information processing apparatus according to claim 7, wherein an execution setting value obtained by copying the setting value associated with the object is changed so as to comply with the PDF/A standard in a case where the setting value does not comply with the PDF/A standard.

11. A control method for an image forming apparatus equipped with a reading unit that reads an image of a document and generates image data, the control method comprising:

a registration step of registering at least one setting value used by the reading unit in generating the image data;

a step of setting whether to enable or disable a function that prevents a user from setting a setting value that does not comply with a PDF/A standard as a setting value used by the reading unit in generating the image data; and a step of changing a setting value that does not comply with the PDF/A standard among the at least one setting value registered so as to comply with the PDF/A standard in enabling the function in a state where the at least one setting value is registered in the registration step.

12. A control method for an information processing apparatus causing an image forming apparatus to read an image of a document and to generate image data according to an instruction from a user, the control method comprising:

a registration step of registering at least one setting value used by the image forming apparatus in generating the image data;

a step of setting whether to enable or disable a function that prevents a user from setting a setting value that does not comply with a PDF/A standard as a setting value used by the image forming apparatus in generating the image data;

a step of changing a setting value that does not comply with the PDF/A standard among the at least one setting value so as to comply with the PDF/A standard in enabling the function in a state where the at least one setting value is registered in the registration step; and a step of transmitting an instruction notification that instructs the image forming apparatus to generate the image data based on the setting value changed.

13. A non-transitory computer-readable storage medium storing a control program causing a computer to execute a control method for an image forming apparatus equipped with a reading unit that reads an image of a document and generates image data, the control method comprising:

a registration step of registering at least one setting value used by the reading unit in generating the image data;

a step of setting whether to enable or disable a function that prevents a user from setting a setting value that does not comply with a PDF/A standard as a setting value used by the reading unit in generating the image data; and a step of changing a setting value that does not comply with the PDF/A standard among the at least one setting value registered so as to comply with the PDF/A standard in enabling the function in a state where the at least one setting value is registered in the registration step.

14. A non-transitory computer-readable storage medium storing a control program causing a computer to execute a control method for an information processing apparatus causing an image forming apparatus to read an image of a document and to generate image data according to an instruction from a user, the control method comprising:

a registration step of registering at least one setting value used by the image forming apparatus in generating the image data;

a step of setting whether to enable or disable a function that prevents a user from setting a setting value that does not comply with a PDF/A standard as a setting value used by the image forming apparatus in generating the image data;

a step of changing a setting value that does not comply with the PDF/A standard among the at least one setting value so as to comply with the PDF/A standard in enabling the function in a state where the at least one setting value is registered in the registration step; and a step of transmitting an instruction notification that instructs the image forming apparatus to generate the image data based on the setting value changed.

* * * * *